United States Patent
Yoshinari et al.

(10) Patent No.: US 8,310,745 B2
(45) Date of Patent: Nov. 13, 2012

(54) METHOD FOR FORMING MULTILAYER REFLECTION HOLOGRAM IN OPTICAL RECORDING MEDIUM

(75) Inventors: Jiro Yoshinari, Tokyo (JP); Atsuko Kosuda, Tokyo (JP); Naoki Hayashida, Tokyo (JP); Motohiro Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 564 days.

(21) Appl. No.: 12/654,445

(22) Filed: Dec. 18, 2009

(65) Prior Publication Data

US 2010/0195177 A1    Aug. 5, 2010

(30) Foreign Application Priority Data

Jan. 30, 2009  (JP) ................. 2009-019985

(51) Int. Cl.
*G03H 1/10* (2006.01)
(52) U.S. Cl. ......................................................... 359/10
(58) Field of Classification Search .................. None
See application file for complete search history.

(56) References Cited

U.S. PATENT DOCUMENTS

| | | | |
|---|---|---|---|
| 6,212,148 B1 | 4/2001 | Hesselink et al. | |
| 6,574,174 B1 | 6/2003 | Amble et al. | |
| 6,614,741 B1 | 9/2003 | Hesselink et al. | |

FOREIGN PATENT DOCUMENTS

JP    A 2002-502057    1/2002

OTHER PUBLICATIONS

Miyamoto et al.; "Direct Servo Error Signal Detection Method from Recorded Micro-Reflectors;" Tech Digest ISOM/ODS2008; MB04; pp. TD05-07(1)-TD05-07(3); 2008.

*Primary Examiner* — Derek S Chapel
(74) *Attorney, Agent, or Firm* — Oliff & Berridge, PLC

(57) ABSTRACT

A method for forming an information recording layer including a multilayer stack of reflection hologram layers modulated in the depth direction of a hologram material layer is provided. The method includes: generating a first pair of polarized coherent laser beams and a second pair of polarized coherent laser beams that are incoherent with the first pair; directing the first pair of polarized coherent laser beams to the hologram material layer from opposite sides thereof, respectively, such that the incident angles of the first pair are symmetric with respect to the hologram material layer; directing the second pair of polarized coherent laser beams to the hologram material layer from the opposite sides thereof, respectively, at incident angles different from the incident angles of the first pair; and forming the multilayer stack of reflection hologram layers according to the interference pattern of the first and second pairs of polarized coherent laser beams.

2 Claims, 4 Drawing Sheets

METHOD FOR FORMING MULTILAYER REFLECTION HOLOGRAM IN OPTICAL RECORDING MEDIUM

BACKGROUND OF THE INVENTION

1. Field of the Invention

The present invention relates to a method for forming in an optical recording medium a multilayer reflection hologram serving as an information recording layer for recording information using holography.

2. Description of the Related Art

Japanese Translation of PCT International Application No. 2002-502057 discloses a system and a method for writing data by forming a format hologram (reflection hologram) in a recording medium and subsequently locally altering the format hologram to change the reflectivity for bit-by-bit recording.

In a system disclosed in U.S. Pat. No. 6,574,174B1, information is recorded in a recording medium by locally altering a format hologram, in a manner as described above, and the recording medium includes, in addition to a hologram layer, a dedicated servo layer used for servo control.

Miyamoto et al., Tech. Digest of ISOM/ODS2008, MB04 discloses that when information is reproduced while servo control is performed using a dedicated servo layer as described above, the tilt margin of an optical head is small and this leads to difficulty in achieving good reproduction.

Miyamoto et al., Tech. Digest of ISOM/ODS2008, MB04 also discloses that tracking servo characteristics with tilt margin can be obtained by providing a hologram recording layer as a micro hologram and directly tracking-servo-controlling this micro hologram itself.

As described above, the use of the dedicated servo layer during reproduction of an optical recording medium that uses a format hologram leads to difficulty in achieving good information reproduction because the tilt margin is small.

When tracking servo control (direct servo control) is performed directly on the surface of a micro hologram, a large tile margin can be obtained. However, when a plurality of format hologram layers are provided, a huge amount of time is required to form servo marks in each layer, and this causes a significant increase in the cost of manufacturing the optical recording medium.

It has been proposed that to increase the recording capacity of an optical recording medium, a multilayer stack of reflection hologram layers is formed. However, to perform direct servo control on the multilayer stack of hologram layers, the hologram must be modulated in the depth direction, and the focus servo control of recording-reproduction light must be performed.

To spatially modulate a hologram, the information recording layer may be formed as an alternate stack of hologram layers and spacer layers, or a modulated hologram may be recorded in a uniform information recording layer. However, to successively deposit the hologram and spacer layers, a deposition step is required. Unfortunately, this leads to an increase in the manufacturing cost of the optical recording medium.

To record a modulated hologram, mutually opposed laser beams are brought to interference in a hologram material to successively form localized reflection holograms. However, in this method, the area of interference fringes (reflection hologram) formed at a single time is small, so that a large amount of time is required to form the holograms over the entire optical recording medium. In addition, since areas other than the areas of the interference fringes are exposed to light, the efficiency of hologram formation is low.

SUMMARY OF THE INVENTION

In view of the foregoing problems, various exemplary embodiments of this invention provide a method for forming a multilayer reflection hologram in an optical recording medium at a low cost in which information can be reproduced by direct servo control.

The present inventor has found that a multilayer stack of reflection hologram layers modulated in a depth direction can be formed in an optical recording medium by using two pairs of laser beams (four beams in total). The inventor has also found that good characteristics such as a wide tilt margin can be obtained at a low cost as follows. When information is recorded on the optical recording medium having the multilayer stack of reflection hologram layers formed therein, tracking servo control is performed using a servo layer provided separately from the reflection hologram layers, and data information and tracking information are recorded in each single reflection hologram layer. The information is reproduced by using the tracking information formed in the multilayer stack of reflection hologram layers.

In summary, the above-described objectives are achieved by the following embodiments of the present invention.

(1) A method for forming a multilayer reflection hologram in an optical recording medium, the optical recording medium including a hologram material layer, the method comprising applying two laser beams to the hologram material layer to form a reflection hologram layer according to an interference pattern of the two laser beams, the method further comprising: generating a first pair of polarized coherent laser beams and a second pair of polarized coherent laser beams that are incoherent with the first pair of polarized coherent laser beams; directing the first pair of polarized coherent laser beams to the hologram material layer from opposite sides thereof, respectively, such that incident angles of the first pair of polarized coherent laser beams are symmetric with respect to the hologram material layer; directing the second pair of polarized coherent laser beams to the hologram material layer from opposite sides thereof, respectively, such that incident angles of the second pair of polarized coherent laser beams are symmetric with respect to the hologram material layer, the incident angles of the first pair of polarized coherent laser beams being different from the incident angles of the second pair of polarized coherent laser beams; and forming the multilayer reflection hologram modulated in a depth direction of the hologram material layer according to an interference pattern of the first pair of polarized coherent laser beams and the second pair of polarized coherent laser beams.

(2) The method for forming a multilayer reflection hologram in an optical recording medium according to (1), wherein the first pair of polarized coherent laser beams and the second pair of polarized coherent laser beams are split from a single laser beam, each of the first pair of polarized coherent laser beams being one of a p-polarized laser beam and an s-polarized laser beam, each of the second pair of polarized coherent laser beams being the other of the p-polarized laser beam and the s-polarized laser beam, each of the second pair of polarized coherent laser beams being incident on the hologram material layer at an angle $\theta$ with respect to a corresponding one of the first pair of polarized coherent laser beams.

According to the method for forming a multilayer reflection hologram of the present invention, a multilayer stack of reflection hologram layers modulated in the depth direction of the hologram material layer can be easily formed at a low cost.

DETAILED DESCRIPTION OF THE PREFERRED EMBODIMENT

Hereinafter, a preferred exemplary embodiment of the present invention will be described with reference to the drawings.

First Exemplary Embodiment

Figure 1:
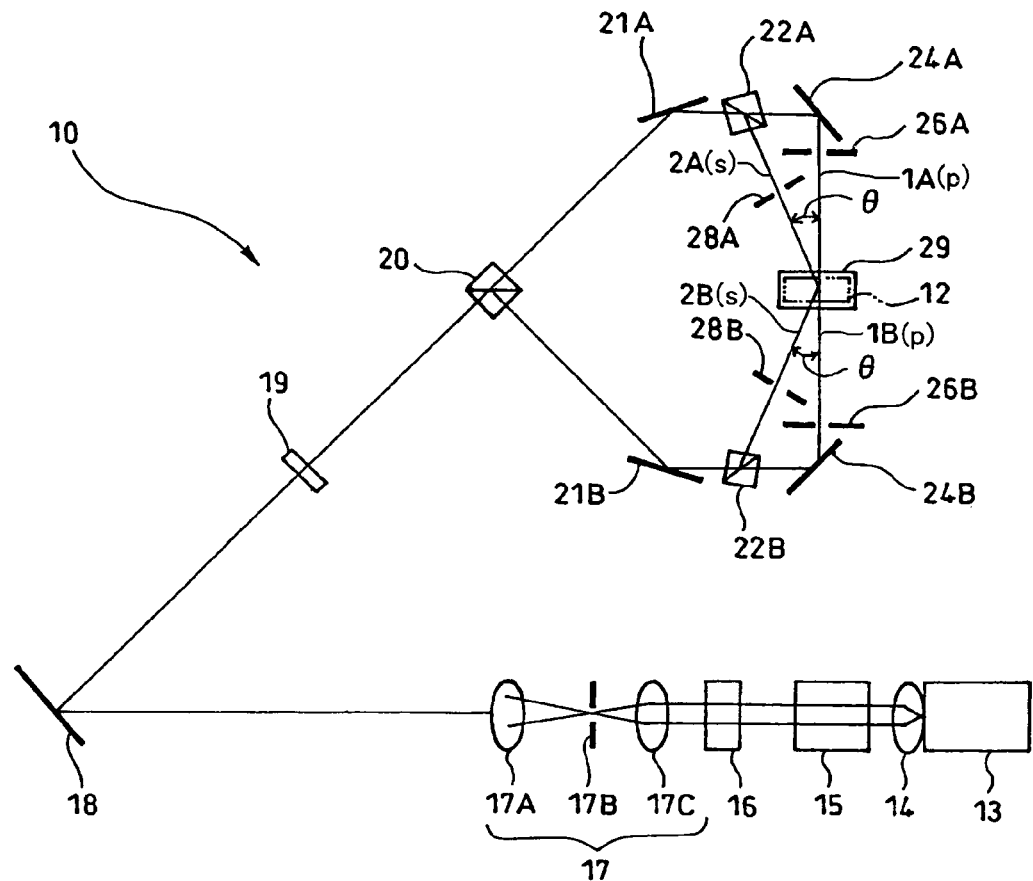
FIG. 1 is a block diagram illustrating a reflection hologram forming optical system for performing a method for forming a multilayer reflection hologram according to a first exemplary embodiment of the present invention.
Figure 2:
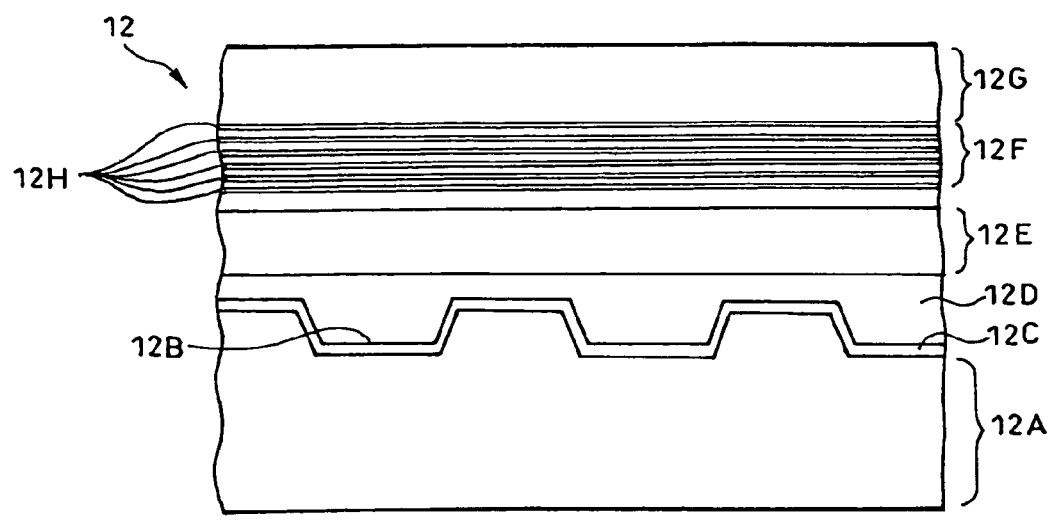
FIG. 2 is a schematic cross-sectional view illustrating an optical recording medium including a multilayer stack of reflection hologram layers formed using the reflection hologram forming optical system shown in FIG. 1.

In this exemplary embodiment, a reflection hologram forming optical system 10 shown in FIG. 1 is used to form a plurality of reflection hologram layers in a hologram material, whereby an optical recording medium 12 (see FIG. 2) including a multilayer stack of the reflection hologram layers is formed. The reflectivity (diffraction efficiency) of the hologram is determined using a reflection hologram measuring optical system 30 shown in FIG. 3.

The optical recording medium 12 in this exemplary embodiment includes an information recording layer 12F. The information recording layer 12F includes a plurality of reflection hologram layers 12H that are formed in a hologram material layer so as to be arranged in a depth direction by adjusting the depthwise spatial modulation period of the reflection hologram formed. It should be noted that the information recording layer before the plurality of reflection hologram layers are formed is referred to as the hologram material layer.

First, with reference to FIG. 1, a description will be given of the reflection hologram forming optical system 10 that is used to perform a method for forming a multilayer reflection hologram according to the present invention.

The reflection hologram forming optical system 10 includes: an external cavity LD (hereinafter referred to as ECLD) 13 that emits a laser beam; an anamorphic prism 14 that shapes the laser beam emitted from the ECLD 13 into a substantially circular shape; an optical isolator 15; an optical shutter 16; a spatial filter 17 including a pair of lenses 17A and 17C that improve the profile of the laser beam having passed through the optical shutter 16 and a pinhole 17B disposed between the pair of lenses 17A and 17C; a mirror 18; a ½ wave plate 19 that changes the phase of the laser beam reflected from the mirror 18; and a beam splitter 20 that splits the laser beam into two beams. The ½ wave plate 19 is disposed such that the laser beam passing therethrough is a 45° polarized beam (that is in between s- and p-polarized beams).

In the reflection hologram forming optical system 10, the laser beam passing through the beam splitter 20 is reflected from a mirror 21A and split by a polarization beam splitter 22A into a transmission beam (p-polarized beam) and a reflected beam (s-polarized beam). The p-polarized laser beam 1A is reflected at 90° by a mirror 24A and reduced in beam diameter to 4 mm through an aperture 26A. The s-polarized laser beam 2A is reduced in beam diameter to about 4 mm through an aperture 28A. The p- and s-polarized beams enter, from above in FIG. 1, an unexposed optical recording medium 12 (hereinafter referred to as a sample 12) that has no hologram formed therein and is installed in a sample holder 29. The p-polarized laser beam 1A is perpendicularly incident on the upper surface of the sample 12, and the s-polarized laser beam 2A intersects the p-polarized laser beam 1A at an angle θ.

The laser beam reflected from the beam splitter 20 is reflected from a mirror 21B and split by a polarization beam splitter 22B into a p-polarized laser beam 1B and an s-polarized beam 2B. The p-polarized laser beam 1B passes through an aperture 26B and enters the sample 12 from below, and the s-polarized laser beam 2B passes through an aperture 28B and enters the sample 12 from below. The p-polarized laser beam 1B is perpendicularly incident on the lower surface of the sample 12, and the s-polarized laser beam 2B intersects the p-polarized laser beam 1B at an angle θ in the hologram material layer.

The p-polarized laser beam 1A and the p-polarized laser beam 1B consist a first pair of polarized coherent laser beams and the s-polarized laser beam 2A and the s-polarized laser beam 2B consist a second pair of polarized coherent laser beams.

In the first exemplary embodiment, the hologram recording material was prepared as follows.

Synthesis of Organometallic Fine Particle Material 3.65 g of tetra-n-butoxy titanium ($Ti(OC_4H_9)_4$, product of Kojundo Chemical Laboratory Co., Ltd.) and 3.1 g of 2-ethyl-1,3-hexandiol (product of Tokyo Kagaku Kogyo K. K.) were mixed in 1 mL of an n-butanol solvent at room temperature, and the mixture was stirred for 10 minutes. 2.6 g of diphenyldimethoxysilane (LS-5300, product of Shin-Etsu Chemical Co., Ltd.) was added to the reaction mixture ($Ti(OC_4H_9)_4$/2-ethyl-1,3-hexandiol=1/2 (molar ratio)), and the resultant mixture was used as a metal alkoxide solution (Ti/Si=1/2 (molar ratio)).

A solution containing 0.2 mL of water, 0.08 mL of a 2N aqueous hydrochloric acid solution, and 1 mL of a butanol solvent was added dropwise to the prepared metal alkoxide solution at room temperature under stirring, and the mixture was stirred for 1 hour to allow hydrolysis and condensation reactions to proceed. The above procedure gave a sol solution.

Photopolymerizable Monomer

3 Parts by weight of Irgacure 907 (photopolymerization initiator, product of Ciba Specialty Chemicals) and 0.2 parts by weight of thioxanthen-9-one (photosensitizer) were added to 100 parts by weight of polyethylene glycol diacrylate (photopolymerizable compound, Aronix M-245, product of TOA-GOSEI CO., LTD.) to prepare a mixture containing the photopolymerizable compound.

Hologram Recording Material Solution

The above-prepared sol solution and the mixture containing the photopolymerizable compound were mixed at room temperature such that the amount of the organometallic matrix material (the amount as a nonvolatile component) was 80 parts by weight and the amount of the photopolymerizable compound was 20 parts by weight. The resultant mixture was further stirred with protection from light for 1 hour to allow hydrolysis and condensation reactions to proceed sufficiently, whereby a hologram recording material solution was obtained.

Configuration of Hologram Substrate

Grooves 12B with a track pitch of 0.74 μm were formed in a glass disc substrate 12A having a diameter of 120 mm and a thickness of 1 mm using a 2P method to thereby prepare a hologram medium. A dichroic film 12C was deposited on the glass disc substrate 12A by sputtering, and the resultant product was used as a sample 12.

The dichroic film 12C was deposited as a stack of silicon nitride 80 nm/silicon oxide 110 nm/silicon nitride 80 nm/silicon oxide 110 nm/silicon nitride 80 nm. The spectral characteristics of the dichroic film 12C were measured. The reflectivity for red light (wavelength: 650 nm) was 60%, and the reflectivity for blue light (wavelength: 405 nm) was 7%.

According to an optical simulation, the characteristics of the dichroic film 12C after the hologram medium was deposited were such that the reflectivity for red light was 50% and the reflectivity for blue light was 0.5%. This indicates that since the dichroic film 12C reflects 50% of red light and almost no blue light, a reflection hologram can be formed using the reflection hologram forming optical system 10.

Configuration of Optical Recording Medium

A glass substrate 12E having a thickness of 450 μm was bonded with a UV adhesive (an adhesive layer 12D) to the glass disc substrate 12A having the grooves 12B formed therein and having the dichroic film 12C deposited thereon. Next, the above-prepared hologram recording material solution was applied by spin-coating and dried at 80° C. for 24 hours to volatilize the solvent, whereby a hologram recording material layer having a dry thickness of 20 μm was obtained.

The hologram recording material layer was covered with a cover layer 12G formed of a polycarbonate sheet having a thickness of 100 μm to thereby give an optical recording medium (sample) having no reflection hologram layers formed therein.

Formation of Reflection Hologram Layers

The sample 12 was installed in the sample holder 29 in the reflection hologram forming optical system 10 shown in FIG. 1, and a reflection hologram was formed.

In the reflection hologram forming optical system 10, the ECLD 13 emits a laser beam of a wavelength of 405 nm. The beam profile of this laser beam is improved by the spatial filter 17, and the beam diameter is expanded to about 10 mm. The laser beam is then reflected from the mirror 18, converted to a 45° polarized beam by the ½ wave plate 19, and split into two beams, a transmission beam and a reflected beam, by the beam splitter 20.

In the reflection hologram forming optical system 10, the two 45° polarized beams split by the beam splitter 20 are further split by the polarization laser beam splitters 22A and 22B into p-polarized and s-polarized laser beams. The resultant four beams simultaneously enter the optical recording medium 12 from above and below to form a hologram.

Suppose that the laser beams incident in the normal direction (thickness or depth direction) on the optical recording medium 12 in the sample holder 29 are p-polarized beams 1A and 1B (a first pair of polarized coherent laser beams), and that the laser beams incident on the optical recording medium 12 at an angle θ with respect the p-polarized laser beams 1A, 1B are s-polarized laser beams 2A and 2B (a second pair of polarized coherent laser beams). In this case, the angle θ allows modulation with a spatial period in the depth direction to be generated in the reflection hologram.

Here, the first pair of polarized coherent laser beams 1A, 1B are set to direct to the optical recording medium 12 (hologram material layer) from opposite sides thereof, respectively, and such that incident angles of the first pair of polarized coherent laser beams 1A, 1B are symmetric with respect to the hologram material layer.

Further, the second pair of polarized coherent laser beams 2A, 2B are set to direct to the hologram material layer from opposite sides thereof, respectively, and such that incident angles of the second pair of polarized coherent laser beams 2A, 2B are symmetric with respect to the hologram material layer.

Next, a description is given of the depthwise spatial modulation generated in the reflection hologram.

Figure 4:
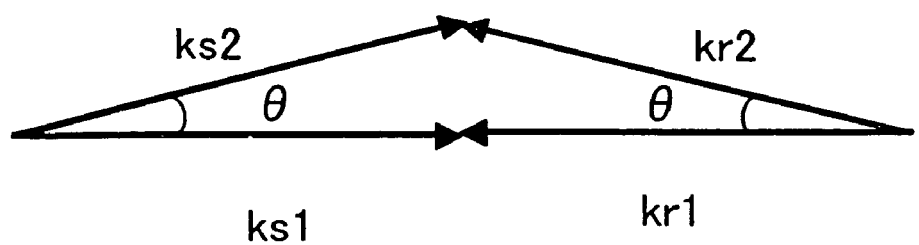
FIG. 4 is a vector diagram for illustrating the spatial modulation when the modulation with a spatial period in the depth direction is generated in the reflection hologram using the reflection hologram forming optical system.

FIG. 4 shows the relationship between the vectors of the laser beams incident on a reflection hologram forming area. ks1 and kr1 represent the vectors of the p-polarized beams incident in the normal direction to the medium, and ks2 and kr2 represent the vectors of the s-polarized beams incident at an intersecting angle θ.

Since the p-polarized beams do not interfere with the s-polarized beams, the vector of the interference fringes is the sum of the interference vector of the p-polarized beams and the interference vector of the s-polarized beams. Generally, this is represented by the following equations (1) to (5).

$$\sum\nolimits_{s1} = \exp(ikz) \quad (1)$$

$$\sum\nolimits_{s2} = \exp[ik(x\sin\theta + z\cos\theta)] \quad (2)$$

$$\sum\nolimits_{r1} = \exp(-ikz) \quad (3)$$

$$\sum\nolimits_{r2} = \exp[ik(-x\sin\theta + z\cos\theta)] \quad (4)$$

$$I_z \propto 1 + \frac{1}{a_1 + a_2}\left(a_2\cos\left(\frac{4\pi}{\lambda}z\cos\theta\right) + a_1\cos\frac{4\pi}{\lambda}z\right) \quad (5)$$

In the equation (5), Iz is the intensity of the hologram, $a_1$ and $a_2$ are the intensity ratios of the p- and s-waves, λ is the wavelength of the incident laser beams, and z is the depth of the interference fringes.

Figure 5:
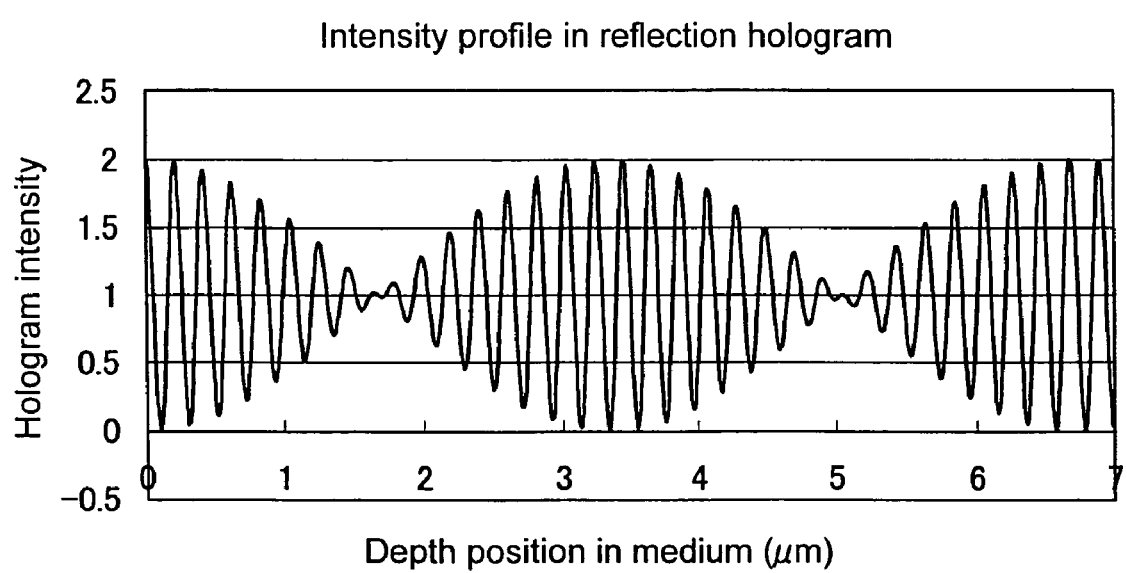
FIG. 5 shows an intensity distribution profile showing the relationship between the hologram intensity of the reflection hologram and the depth in the medium.

In the equations (1) to (5), when the wavelength λ of the laser beams is 405 nm, θ=20°, and the intensity ratios of the p- and s-waves are 1:1, then the depth profile of the interferential fringes shown in FIG. 5 is obtained from equation (5), and the spatial modulation period of the reflection hologram layers 12H is found to be about 3.5 μm.

The above-prepared sample 12 was installed in the sample holder 29 of the reflection hologram forming optical system 10, and a reflection hologram was formed.

In this case, θ was set to 6°, and the powers of the laser beams for forming the hologram were set such that the intensity ratios of the s- and p-waves were 1:1. The intensities were 300 μW on the front surface of the information recording layer. The sample was exposed to the laser beams for 60 seconds. The modulation period of the reflection hologram layers 12H was 6 µm, as computed using the equations (1) to (5). Then, LED light having a center wavelength of 400 nm was applied to post-cure the hologram material, so that the polymerization reaction of the hologram material was completed. The optical recording medium 12 was thereby completed.

Figure 3:
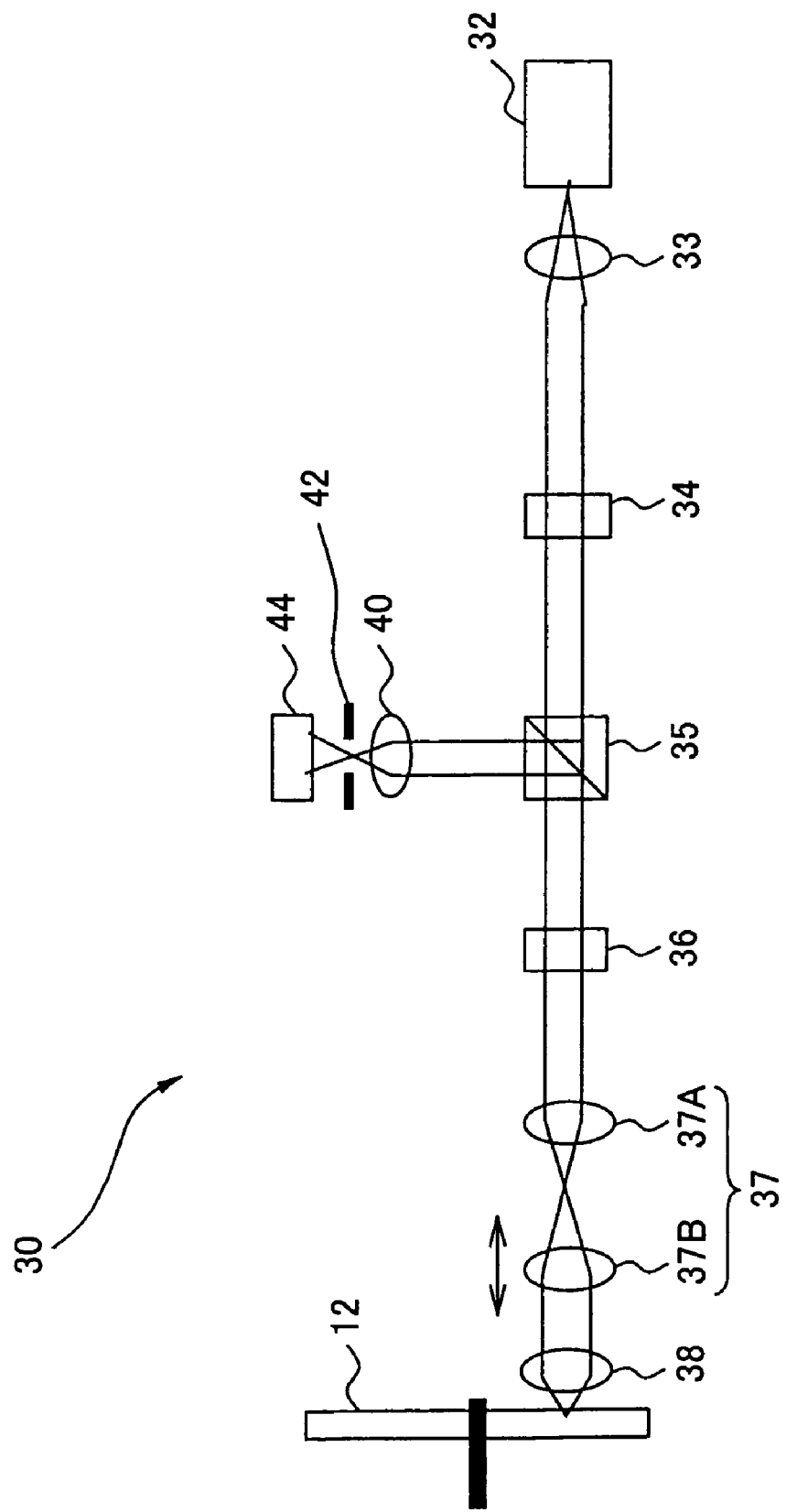
FIG. 3 is a block diagram illustrating a hologram measuring optical system for determining depthwise modulation of the reflection hologram formed using the reflection hologram forming optical system shown in FIG. 1.

Next, a description will be given of the reflection hologram measuring optical system 30 shown in FIG. 3 that is used for the optical recording medium 12.

This reflection hologram measuring optical system 30 includes a laser diode 32 that emits a blue laser beam of a wavelength of 405 nm and further includes, between the laser diode 32 and the optical recording medium 12 having the reflection hologram formed therein: a collimator lens 33; a ½ wave plate 34; a polarization beam splitter 35; a ¼ wave plate 36; a relay lens system 37; and an objective lens 38 in that order. This optical system 30 further includes: a condensing lens 40 that focuses the polarized beam reflected from the optical recording medium 12 toward the polarization beam splitter 35 and reflected therefrom; a pinhole 42 that reduces the diameter of the light beam from the condensing lens 40 to 0.2 mm; and a photodetector 44 that receives the laser beam having a reduced diameter.

The relay lens system 37 includes a condensing lens 37A and a shift lens 37B. By moving the shift lens 37B relative to the condensing lens 37A on the optical axis, the focusing point of the objective lens 38 is moved in the optical recording medium 12 in its thickness (depth) direction.

In the reflection hologram measuring optical system 30, the divergent laser beam emitted from the laser diode 32 is collimated by the collimator lens 33 and converted to a p-polarized beam by the ½ wave plate 34.

This p-polarized laser beam passes through the polarization beam splitter 35, is converted to a circularly polarized beam by the ¼ wave plate 36, passes through the relay lens system 37, and is focused on a point in the optical recording medium 12 through the objective lens 38. The converging beam becomes a collimated beam near the focusing point and interferes with the reflection hologram formed in the optical recording medium 12 to produce a reflected (diffraction) beam.

This reflected beam returns in the reverse direction, passes through the objective lens 38, the relay lens system 37, and the ¼ wave plate 36, and is converted to an s-polarized beam. The s-polarized beam is reflected at 90° by the polarization beam splitter 35, condensed by the condensing lens 40, and passes through the pinhole 42, and the beam having a reduced diameter is detected by the photodetector 44.

The region where the incident laser beam becomes a collimated beam near the focusing point in the optical recording medium 12 is represented by a condensing width $w=\lambda/NA$ and a condensing depth $L=4\lambda n/NA^2$, where $\lambda$ is the wavelength, NA is the numerical aperture of the objective lens, and n is the refractive index of the hologram medium.

With the reflection hologram measuring optical system 30, when $\lambda=405$ nm, NA=0.85, and the refractive index of the hologram medium n=1.64, then the condensing width w is 0.48 µm, and the condensing depth L is 3.6 µm. The reflected beam from the reflection hologram layer in this region can be detected.

The pinhole 42 disposed in front of the photodetector 44 is provided to block stray light reflected from reflection hologram layers other than the reflection hologram layer at the focusing point. The focusing point can be moved by moving the shift lens 37B of the relay lens system 37, and the light reflected from the region having the condensing width w=0.48 µm at the condensing depth L=3.6 µm can be detected.

Figure 6:
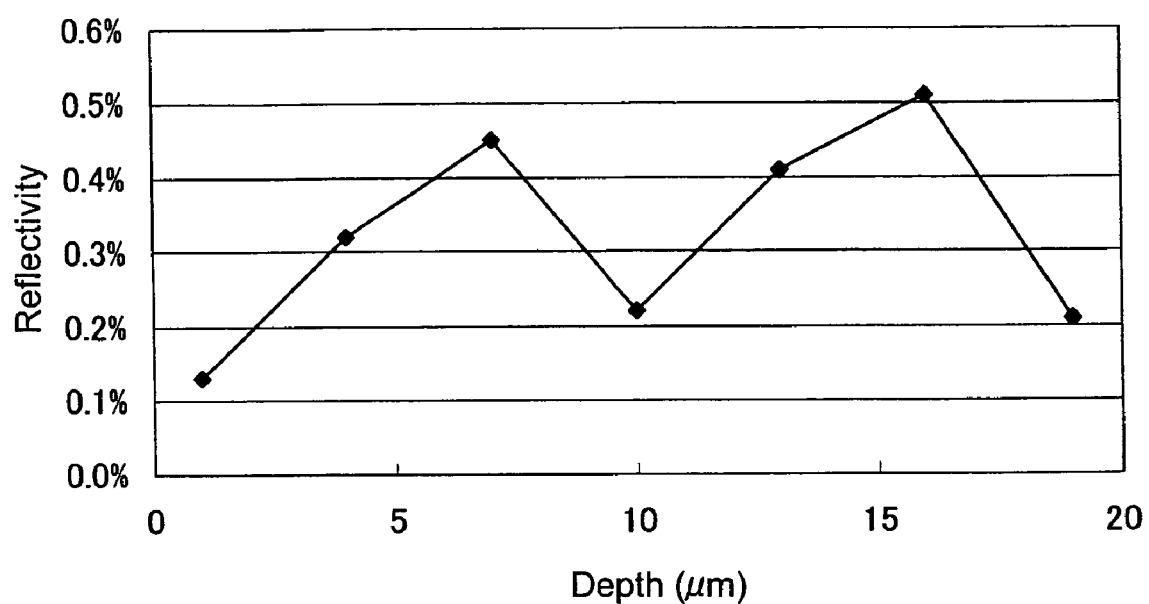
FIG. 6 is a graph showing the depth dependence of reflectivity, representing the relationship between the reflectivity and the depth in the reflection hologram layers.

FIG. 6 shows the measurement results of the depth dependence of the reflectivity of the reflection hologram layer 12H at the focusing point when the central focusing point of the objective lens 38 is moved from the interface between the polycarbonate sheet (the cover layer 12G) and the information recording layer in the direction toward the glass substrate 12E.

As can be seen from FIG. 6, the reflectivity exhibits two maximums spaced apart by about 8 µm in the depth direction. The reflection hologram layers 12H modulated with a period of about 8 µm were found to be formed.

Data signals and servo signals were recorded-reproduced in-from the optical recording medium 12 including the reflection hologram layers using an optical recording medium reproducing apparatus. The reproduction signals were satisfactory.

According to the present invention, a multilayer stack of reflection hologram layers modulated in the depth direction can be formed in a hologram material layer using a simple apparatus.

What is claimed is:

1. A method for forming a multilayer reflection hologram in an optical recording medium, the optical recording medium including a hologram material layer, the method comprising applying two laser beams to the hologram material layer to form a reflection hologram layer according to an interference pattern of the two laser beams, the method further comprising: generating a first pair of polarized coherent laser beams and a second pair of polarized coherent laser beams that are incoherent with the first pair of polarized coherent laser beams; directing the first pair of polarized coherent laser beams to the hologram material layer from opposite sides thereof, respectively, such that incident angles of the first pair of polarized coherent laser beams are symmetric with respect to the hologram material layer; directing the second pair of polarized coherent laser beams to the hologram material layer from opposite sides thereof, respectively, such that incident angles of the second pair of polarized coherent laser beams are symmetric with respect to the hologram material layer, the incident angles of the first pair of polarized coherent laser beams being different from the incident angles of the second pair of polarized coherent laser beams; and forming the multilayer reflection hologram modulated in a depth direction of the hologram material layer according to an interference pattern of the first pair of polarized coherent laser beams and the second pair of polarized coherent laser beams.

2. The method for forming a multilayer reflection hologram in an optical recording medium according to claim 1, wherein
the first pair of polarized coherent laser beams and the second pair of polarized coherent laser beams are split from a single laser beam, each of the first pair of polarized coherent laser beams being one of a p-polarized laser beam and an s-polarized laser beam, each of the second pair of polarized coherent laser beams being the other of the p-polarized laser beam and the s-polarized laser beam, each of the second pair of polarized coherent laser beams being incident on the hologram material layer at an angle θ with respect to a corresponding one of the first pair of polarized coherent laser beams.

* * * * *